UNITED STATES PATENT OFFICE.

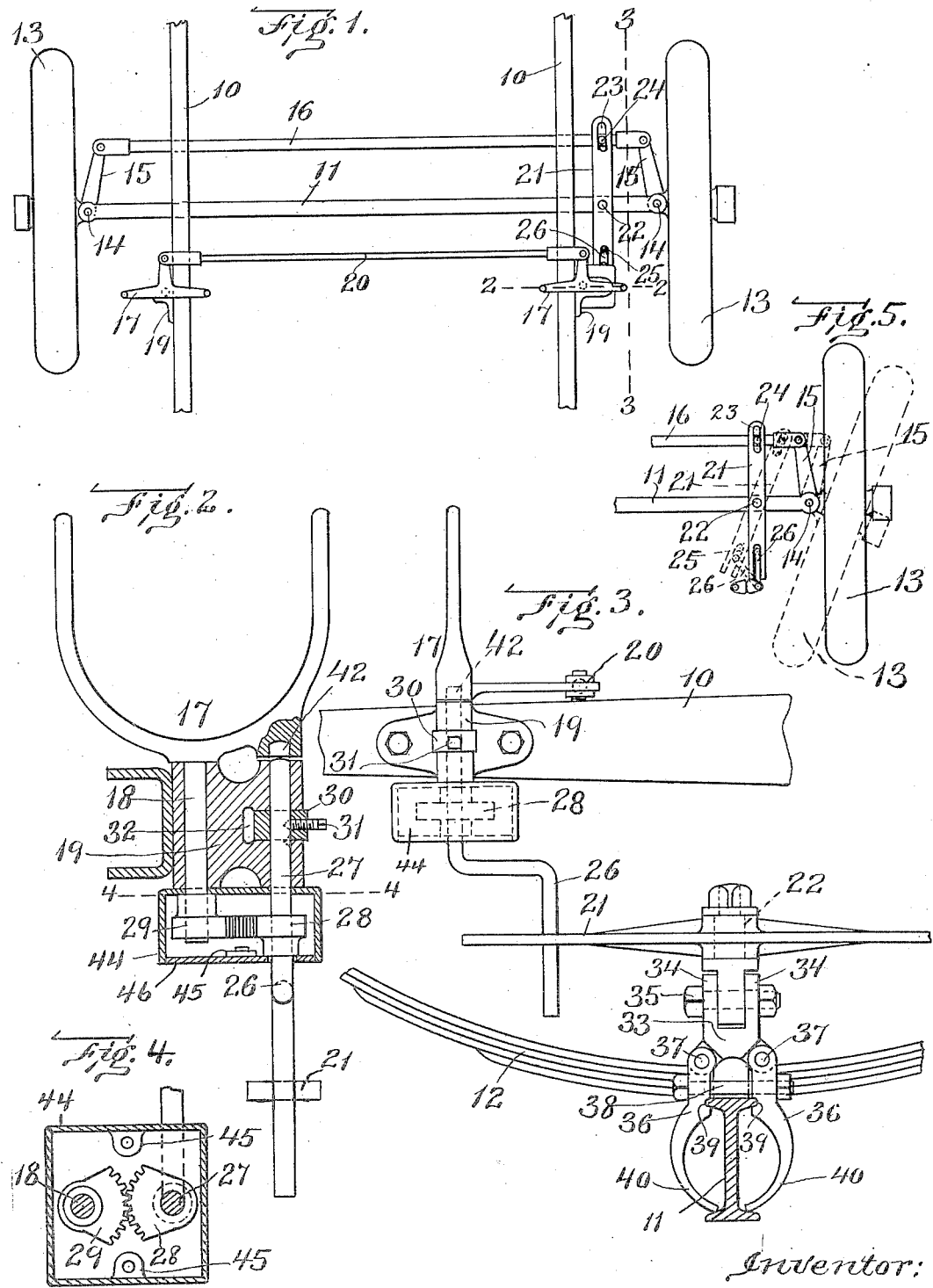

ARTHUR G. CERDA, OF MORELIA, MEXICO, ASSIGNOR TO CHARLES WHITTEMORE, OF NEWTON, MASSACHUSETTS.

ROTATABLE HEADLIGHT FOR AUTOMOBILES.

1,097,612.   Specification of Letters Patent.   Patented May 26, 1914.

Application filed January 24, 1910. Serial No. 539,719.

*To all whom it may concern:*

Be it known that I, ARTHUR G. CERDA, of Morelia, Michoacan, Mexico, a citizen of the United States of Mexico, have invented certain new and useful Improvements in Rotatable Headlights for Automobiles, of which the following is a specification.

This invention relates to headlights for automobiles and has for its object the provision of one or more rotatable lamp-holders, and mechanism of improved construction and arrangement for transmitting motion from the steering mechanism to the lamp-holder or holders whereby the latter may be turned in the direction in which the automobile moves in describing a curve.

The invention is adapted to automobiles or other vehicles in which two independently pivoted traction wheels are provided for steering purposes, and which are further provided with means for turning the wheels in unison about their independent pivots.

One of the objects of the invention is to provide mechanism for transmitting motion from the steering gear to a lamp-holder in such a way that accelerating rotation is imparted to the holder. The result of providing mechanism of this character is that the lamp-holder is turned to a greater degree than the steering wheels, and consequently the range of illumination afforded by the lamp or lamps when the vehicle is describing a curve precedes the change of direction of the vehicle sufficiently to illuminate a point well in advance of the vehicle. It naturally follows that a lamp in turning from a line parallel to the longitudinal line of the vehicle to any angle in either direction is bound to reveal all objects which lie in its range while moving from one position to another.

Another object of the invention is to construct and arrange the actuating mechanism so that it may be included in a relatively small space and so that it may extend in a generally longitudinal direction, rather than a transverse direction.

The mechanism herewith illustrated is of such character as to be adapted to be included in a relatively narrow space, for instance, in the space between one of the wheels and the adjacent longitudinal frame member of the vehicle.

Of the accompanying drawings, which illustrate one form in which the invention may be embodied,—Figure 1 represents a top plan view of the forward part of the frame, running gear and steering gear of an automobile provided with lamp attachments hereinafter described. Fig. 2 represents a section on line 2—2 of Fig. 1. Fig. 3 represents a section on line 3—3 of Fig. 1. Fig. 4 represents a section on line 4—4 of Fig. 2. Fig. 5 represents a diagram illustrating the manner in which accelerating motion is imparted to the lamp-holder.

The same reference characters indicate the same parts wherever they occur.

On the drawings the longitudinal frame members of an automobile are indicated at 10, 10, and are mounted upon the front axle 11 by any preferred form of spring or springs 12. The traction wheels by which the vehicle is steered, are indicated at 13, and are independently pivoted at 14, 14, in the ends of the axle 11, and their stud axles (not shown), are provided with steering arms or levers 15, 15, which are joined by a pivoted connecting-rod 16, which causes them to turn in one and the same direction when either one is swung about its pivot 14.

The structure included in the foregoing description is a common construction and forms no part of the present invention, but is described for the purpose of giving a clear understanding of the means by which the lamp-holders hereinafter described may be rotated.

The lamp-holders indicated at 17, 17, are formed with stems or pivots 18 upon which they are adapted to rotate. According to the arrangement illustrated, the holders are mounted at opposite sides of the vehicle frame and each one is arranged between the frame member 10 and a wheel 13. Brackets 19 may be affixed to the outer sides of the frame members 10 to receive and support the holders 17. A connecting-rod 20 may be pivotally attached to the two holders for transmitting motion from one to the other, when either one is turned about its pivot, but one lamp-holder may be successfully operated without the other.

The means hereinafter described for actuating the holders 17 may be connected to either one and is adapted to be included between one of the frame members 10 and the adjacent wheel 13. The form of actuating mechanism herewith illustrated is adapted for automobiles in which the steering rod 16 is at the rear of the axle 11 and motion is transmitted from the steering rod to one of the lamp-holders by a lever 21 mounted upon a pivot 22. The pivot 22 is preferably mounted upon the axle 11, as hereinafter described. The form of connection between the lever 21 and the steering rod 16 may include a pivot stud 24 affixed to the rod, and a radial slot 23 formed in the lever for the reception of the stud. The lever in its median position extends parallel to the longitudinal line of the vehicle, and its forward end terminates at a point beneath the holder 17 to which it is to be connected, and may be formed with another radial slot, indicated at 25.

26 represents a crank which occupies the slot 25 and which is formed upon, or otherwise connected to, a shaft 27 rotatably mounted in the bracket 19, parallel to the pivot 18. Gear segments 28 and 29 affixed respectively upon the shaft 27 and the pivot 18 transmit rotation from one to the other. The shaft 27 may be held against longitudinal movement by a collar 30 and set-screw 31 binding the collar on the shaft, said collar being arranged in a recess 32 formed in the bracket 19.

When the steering wheels 13 are placed as indicated by full lines in Fig. 5, to guide the vehicle in a straight course, the lamp-holders 17 are positioned to focus their lamps straight ahead, but when the steering wheels are turned in either direction the lamp-holders are correspondingly turned by the motion imparted by the steering rod 16 and transmitted through the lever 21, the crank 26, and the gear segments 28 and 29.

It is apparent that the steering arms 15, when they are approximately at right angles to the steering rod 16, may receive a relatively slight change of angle from the rod, but as the steering arms move farther and farther away from right-angled positions, their change of angularity accelerates. The present invention is adapted to cause acceleration in the change of angularity of the lamp-holders when the change of angularity of the steering wheels accelerates, because the point of connection of the crank with the lever 21 moves radially of the lever. By reference to the dotted line positions in Fig. 5, it will be seen that the crank 26 is moved through a greater angle than the lever 21, thereby moving the lamp-holder through a greater angle than the steering wheels. In this way the lamps, when the vehicle is describing a curve, are adapted to focus at a point in advance of the vehicle, which changes its direction gradually.

It will be noted that the crank 26 extends to a considerable distance above and below the lever 21, and that the crank is therefore adapted to rise and fall with the frame relatively to the lever, without disturbing its operative connection with the lever. Fig. 3 includes a jointed support for the lever 21, which support is adapted to be applied to a variety of axles and to compensate for various inclinations of the axles whereby the pivot 22 may be placed in a perpendicular position irrespective of the irregularities of the axle. The device includes a base member 33 for the pivot stud 22, said base member being formed with ears 34, and a clamping bolt 35 extending through the ears and through an ear at one end of the stud 22. The stud may be moved about the bolt 35 and may be clamped tightly between the ears 34 when the ears are drawn together by the bolt. The base member 33 is provided with a pair of clamping members 36, 36, pivoted at 37, 37 and connected by a bolt 38 by which they may be drawn together. The clamping members are formed with notches 39 and with curved extremities 40. The notches 39 are adapted to engage a flange of an axle of I cross section and the extremities 40 are adapted to embrace a tubular axle.

For the purpose of description, the lamp-holder 17 which is directly actuated by the steering gear, is hereinafter termed the active lamp-holder, and that on the other side of the vehicle is termed the idle lamp-holder. The active lamp-holder and the crank shaft 27 may be interlocked with each other for the purpose of preventing rotation of the holder in case the actuating mechanism becomes damaged. As shown by Fig. 2, the holder is formed with an aperture 42 which is adapted to register with the shaft 27 when the holder is in its midway position. In case it is desired to lock the holder, the set-screw 31 may be loosened and the shaft 27 may be raised sufficiently to place its upper end in the aperture 42, whereupon the set-screw 31 may be again set up tightly. The gear segments 28 and 29 are preferably arranged as shown by Fig. 2, in which sufficient space is provided between the segment 28 and the housing in which it is inclosed to permit the aforesaid upward movement of the shaft 27. By thus employing a part of the motion transmitting mechanism for locking the lamp-holder, it becomes unnecessary to provide extra parts for the purpose. When the active lamp-holder is locked the idle holder is of course held stationary by the connecting-rod 20. The gear case indicated at 44 may be formed of sheet metal and may be open at the bottom and provided with ears 45, adapted to receive screws by which a detachable cover 46 may be held in position.

I claim:

1. The combination with a vehicle having independently pivoted steering wheels, steering arms, and a steering rod connecting the arms, of a pivoted lamp-holder, a crank, means for transmitting motion from the crank to said holder, a member affixed to said steering rod, and a lever connected to said member to be oscillated thereby and having a slotted portion engaging said crank.

2. The combination with a vehicle having independently pivoted steering wheels, and steering means therefor, of a pivotally mounted lamp-holder, a crank whose axle is adapted to engage and lock the lamp-holder, means for holding the crank axle in locking or retracted position, means for transmitting rotation from the crank to the lamp-holder, and means actuated by the steering means for turning said crank.

3. The combination with a vehicle including an axle, independently pivoted steering wheels connected thereby, and steering gear for the wheels, of a rotatable lamp-holder, means including a lever for rotating the holder, an adjustable support for the lever comprising a base, means for rigidly clamping the base to an axle, said means being adapted to embrace axles of various cross-sections, a pivot stud for the lever, and means on the base for clamping said pivot in various positions relatively to the base.

4. The combination with the steering gear of a vehicle, of a rotatably mounted lamp holder, a base therefor, and means operative by the steering gear for turning the lamp holder from side to side, said means comprising a plurality of members one of which is movable from lamp-actuating position to lamp-locking position, said member and said holder having coöperative locking portions.

5. The combination with the steering gear of a vehicle, of a rotatably mounted lamp holder, a base therefor, and means operative by the steering gear for turning the lamp holder from side to side, said means including two coactive gears and a shaft for one of said gears, said shaft being shiftable to uncouple said gears, said shaft and lamp holder having coactive means for locking the holder when said gears are uncoupled.

6. The combination with the steering gear of a vehicle, of a rotatably mounted lamp holder, a base therefor, and means operative by the steering gear for turning the lamp holder from side to side, said means including two coactive members one of which is shiftable relatively to the other for actuating or for locking the lamp holder as the case may be, said members being adapted to preserve their coactive relation notwithstanding such shifting of one of them, said shiftable member and the lamp holder having provisions for locking the holder, and coactive members for transmitting actuating movement from said shiftable member to the lamp holder, one of said transmitting members being movable from coactive relation by shifting said shiftable member to locking position.

In testimony whereof I have affixed my signature, in presence of two witnesses.

ARTHUR G. CERDA.

Witnesses:
W. P. ABELL,
P. W. PEZZETTI.